United States Patent
Yamada et al.

(10) Patent No.: US 7,607,151 B2
(45) Date of Patent: Oct. 20, 2009

(54) APPARATUS FOR AND METHOD OF PROCESSING ELECTRONIC PROGRAM TABLE, AND COMPUTER PROGRAM PRODUCT

(75) Inventors: Akihito Yamada, Tokyo (JP); Masayoshi Murayama, Tokyo (JP)

(73) Assignee: Pioneer Corporation, Tokyo (JP)

( * ) Notice: Subject to any disclaimer, the term of this patent is extended or adjusted under 35 U.S.C. 154(b) by 994 days.

(21) Appl. No.: 11/030,131

(22) Filed: Jan. 7, 2005

(65) Prior Publication Data
US 2005/0155064 A1   Jul. 14, 2005

(30) Foreign Application Priority Data
Jan. 14, 2004   (JP)   .............................. 2004-006846

(51) Int. Cl.
*G06F 3/00* (2006.01)
(52) U.S. Cl. ........................... 725/52; 725/37; 715/788
(58) Field of Classification Search ............. 725/37–39, 725/44–47, 52, 53, 56
See application file for complete search history.

(56) References Cited

U.S. PATENT DOCUMENTS 5,929,932 A * 7/1999 Otsuki et al. ................... 725/47
6,813,774 B2 * 11/2004 Inoue ........................... 725/39

FOREIGN PATENT DOCUMENTS

JP   2002-232805   8/2002

* cited by examiner

*Primary Examiner*—Andrew Y Koenig
*Assistant Examiner*—Aklil Tesfaye
(74) *Attorney, Agent, or Firm*—Drinker Biddle & Reath LLP

(57) ABSTRACT

An electronic program table processing apparatus can obtain the number of receivable channels M and the standard number of channels N displayable on one screen. When EPG display data is generated, the apparatus examines whether or not the number M is smaller than the number N. If so, the apparatus generates the EPG to display the program information for M channels on one screen. If not, the apparatus generates the EPG to display the program information for N channels on one screen.

18 Claims, 8 Drawing Sheets

FIG. 3
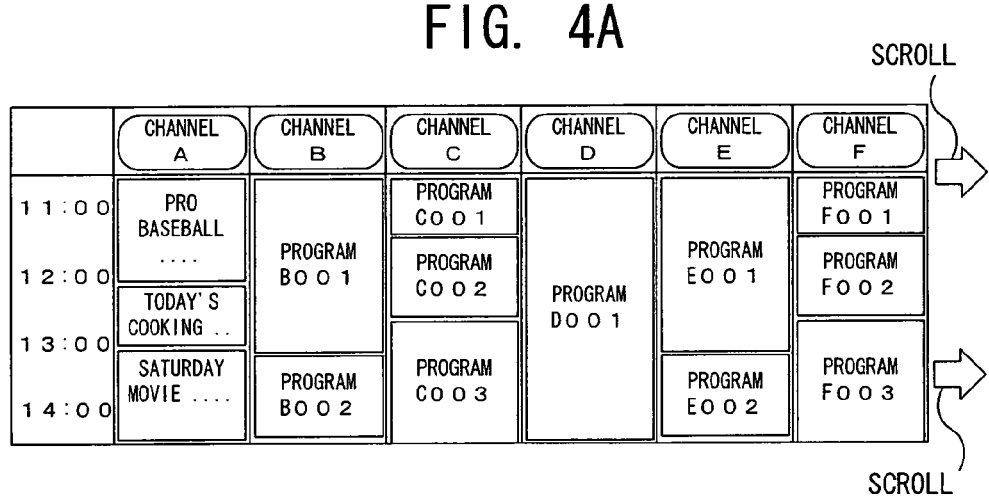
FIG. 4A
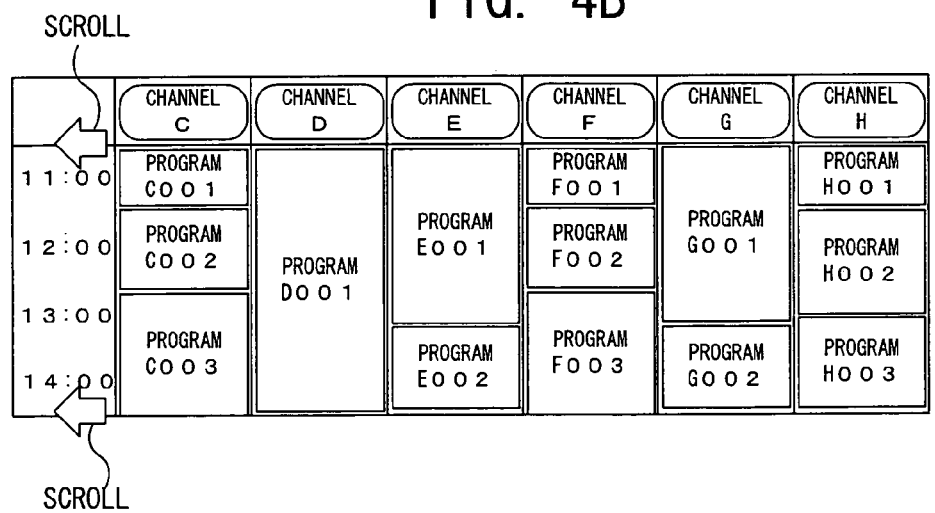
FIG. 4B

FIG. 5A

| | CHANNEL A | CHANNEL C | CHANNEL D | CHANNEL F |
|---|---|---|---|---|
| 11:00 | PRO BASEBALL TOKYO DOME COMMENTATOR:Mr. X | PROGRAM C001 | PROGRAM D001 | PROGRAM F001 |
| 12:00 | | PROGRAM C002 | | PROGRAM F002 |
| 13:00 | TODAY'S COOKING "SEASONAL | | | |
| 14:00 | SATURDAY MOVIE THEATER "AAA OF BBB" | PROGRAM C003 | | PROGRAM F003 |

FIG. 5B

| | CHANNEL A | CHANNEL C | CHANNEL D | CHANNEL F |
|---|---|---|---|---|
| 11:00 | PRO BASEBALL .... | PROGRAM C001 | PROGRAM D001 | PROGRAM F001 |
| 12:00 | TODAY'S COOKING .. | PROGRAM C002 | | PROGRAM F002 |
| 13:00 | SATURDAY MOVIE .... | PROGRAM C003 | | PROGRAM F003 |
| 14:00 | | | | |

FIG. 5C

| | CHANNEL A | CHANNEL C | CHANNEL D | CHANNEL F |
|---|---|---|---|---|
| 11:00 | PRO BASEBALL TOKYO DOME COMMENTATOR:Mr. X | PROGRAM C001 | PROGRAM D001 | PROGRAM F001 |
| 12:00 | | PROGRAM C002 | | PROGRAM F002 |
| 13:00 | TODAY'S COOKING "SEASONAL | | | |
| 14:00 | SATURDAY MOVIE THEATER "AAA OF BBB" | PROGRAM C003 | | PROGRAM F003 |

FIG. 8A

| | CHANNEL A | CHANNEL B | CHANNEL C | CHANNEL D |
|---|---|---|---|---|
| 11:00 | PRO BASEBALL TOKYO DOME COMMENTATOR:Mr.X | PROGRAM B001 | PROGRAM C001 | PROGRAM D001 |
| 12:00 | | | PROGRAM C002 | |
| 13:00 | TODAY'S COOKING "SEASONAL | | | |
| 14:00 | SATURDAY MOVIE THEATER "AAA OF BBB" | PROGRAM B002 | PROGRAM C003 | |

FIG. 8B

| | CHANNEL E | CHANNEL F | CHANNEL AA |
|---|---|---|---|
| 11:00 | PROGRAM E001 | PROGRAM F001 | PROGRAM AA001 |
| 12:00 | | PROGRAM F002 | |
| 13:00 | PROGRAM E002 | PROGRAM F003 | PROGRAM AA002 |
| 14:00 | | | |

FIG. 9A

| | CHANNEL A | CHANNEL B | CHANNEL C | CHANNEL D | CHANNEL E | CHANNEL F |
|---|---|---|---|---|---|---|
| 11:00 | PRO BASEBALL .... | PROGRAM B001 | PROGRAM C001 | PROGRAM D001 | PROGRAM E001 | PROGRAM F001 |
| 12:00 | | | PROGRAM C002 | | | PROGRAM F002 |
| 13:00 | TODAY'S COOKING .. | | | | | |
| 14:00 | SATURDAY MOVIE .... | PROGRAM B002 | PROGRAM C003 | | PROGRAM E002 | PROGRAM F003 |

FIG. 9B

| | CHANNEL AA | CHANNEL BB | CHANNEL CC | CHANNEL DD | CHANNEL EE | CHANNEL FF |
|---|---|---|---|---|---|---|
| 11:00 | PROGRAM AA001 | PROGRAM BB001 | PROGRAM CC001 | PROGRAM DD001 | PROGRAM EE001 | PROGRAM FF001 |
| 12:00 | | | PROGRAM CC002 | | | PROGRAM FF002 |
| 13:00 | PROGRAM AA002 | | | | | |
| 14:00 | PROGRAM AA003 | PROGRAM BB002 | PROGRAM CC003 | | PROGRAM EE002 | PROGRAM FF003 |

FIG. 9C

| | CHANNEL AAA | CHANNEL BBB | CHANNEL CCC | CHANNEL DDD | CHANNEL EEE |
|---|---|---|---|---|---|
| 11:00 | PROGRAM AAA001 | PROGRAM BBB001 | PROGRAM CCC001 | PROGRAM DDD001 | PROGRAM EEE001 |
| 12:00 | | | PROGRAM CCC002 | | |
| 13:00 | PROGRAM AAA002 | | | | |
| 14:00 | PROGRAM AAA003 | PROGRAM BBB002 | PROGRAM CCC003 | | PROGRAM EEE002 |

APPARATUS FOR AND METHOD OF PROCESSING ELECTRONIC PROGRAM TABLE, AND COMPUTER PROGRAM PRODUCT

BACKGROUND OF THE INVENTION

1. Field of the Invention

The present invention relates to an electronic program table processing apparatus for and an electronic program table processing method of obtaining program information superimposed on a broadcasting wave and displaying an electronic program table on a television screen, for example. The present invention further relates to a computer program product to make a computer function as such an apparatus.

2. Description of the Related Art

An electronic program table processing apparatus generates an electronic program table (or electronic program list) of an electronic program guide (EPG) and displays the electronic program table on a screen, so that a user who is a viewer of the television broadcasting obtains a desired program search result accurately and easily.

For example, an electronic program table processing apparatus disclosed in Japanese Patent Application Laid-Open No. 2002-232805 has a setting device which allows the user to select a display mode from among the following program table display modes (a) to (d) according to his/her preference.

That is, they are (a) a first program table display mode in which program table data for five hours relating to the presently selected channel and two channels adjacent to the presently selected channel is generated, and this program table data is updated by a unit of five hours according to a predetermined lapse of time, (b) a second program table display mode in which program table data for three hours relating to the presently selected channel and four channels adjacent to the presently selected channel is generated, and this program table data is updated by a unit of three hours according to a predetermined lapse of time, (c) a third program table display mode in which program table data for one day relating to the presently selected channel is generated, and this program table data is updated by a unit of one day, according to a predetermined lapse of time, and (d) a fourth program table display mode in which program table data for one hour relating to eight to twelve channels is generated, and this program table data is updated by a unit of one hour.

This electronic program table processing apparatus can be considered to be applicable to many users having various demands, since a plurality of program table modes are prepared in advance.

However, the conventional electronic program table processing apparatus and apparatuses analogous to this often have problems as described below.

In digital broadcasting, the number of receivable channels is different among receiving areas. For example, in a town, the number of receivable channels is relatively large. However, in countryside, the number of receivable channels is relatively small. For example, in an area in which the number of receivable channels is extremely small, many nonuse frames (i.e. blank spaces) appear in the displayed electronic program table, resulting in deteriorated display efficiency. The above-mentioned conventional electronic program table processing apparatus has a plurality of program table display modes, and thereby, it can satisfy various demands of users. However, in this apparatus, the number of channels displayable on one screen is fixed in each program table display mode. Add to this, it is actually impossible to prepare program tables for the all areas. For these reasons, there is a technical problem that the display efficiency of the electronic program table may be deteriorated depending on the receiving state of the broadcasting wave (i.e. differences of the number of receivable channels among areas).

SUMMARY OF THE INVENTION

It is therefore an object of the invention to provide an electronic program table processing apparatus and an electronic program table processing method capable of always providing an electronic program table with high display efficiency depending on a receiving state of a broadcasting wave, and further provide a computer program product for making a computer function as such an apparatus.

To achieve the above-mentioned object, a first electronic program table processing apparatus of the present invention is provided. The first electronic program table processing apparatus is an apparatus for generating an electronic program table on the basis of a broadcasting signal received by a receiving device and displaying the electronic program table on a display device. The broadcasting signal includes video information relating to a plurality of channels and program information to display the electronic program table relating to the plurality of channels. The first electronic program table processing apparatus comprises: a holding device for holding the standard number of channels N (N is natural number) displayable on one screen of the display device; a program information obtaining device for obtaining the program information from the received broadcasting signal; a number obtaining device for obtaining the number of channels M (M is natural number) presently receivable by the receiving device; and a display mode changing device for changing a display mode of the electronic program table displayed on one screen of the display device, depending on the number of channels M obtained by the number obtaining device, if the number of channels M is smaller than the standard number of channels N held by the holding device.

The "channel" herein means a specific frequency range or a broadcasting signal transmitted using that frequency range, and is equal or similar to a channel of a typical television broadcasting receiver.

According to the first electronic program table processing apparatus of the present invention, if the number of receivable channels M is smaller than the standard number of channels N displayable on one screen, the display mode of the electronic display table is changed depending on the number of receivable channels M. Therefore, it is possible to obtain the electronic program table with the display efficiency being always high.

In another aspect of the first electronic program table processing apparatus of the present invention, the number obtaining device obtains the number of channels M on the basis of the obtained program information.

According to this aspect, since the number of channels M is obtained on the basis of the obtained program information, the processing load to obtain the number of channels M can be reduced.

In another aspect of the first electronic program table processing apparatus of the present invention, the display mode changing device maintains a standard display mode of the electronic program table, which is prepared in advance depending on the standard number of channels N, if the number of channels M is not smaller than the standard number of channels N.

According to this aspect, the processing load of the apparatus can be reduced, since the electronic program table is maintained to a standard display mode predetermined depending on the standard number of channels N, in the case that the number of channels M is larger than the standard number of channels N.

In another aspect of the first electronic program table processing apparatus of the present invention, the display mode changing device divides the electronic program table into a plurality of pages switchable to each other on one screen of the display device, depending on the number of channels M and the standard number of channels N, if the number of channels M is larger than the standard number of channels N.

According to this aspect, it is possible to obtain the electronic program table with the display efficiency being always high, since the electronic program table is divided into a plurality of pages switchable to each other to be displayed on one screen of the display device depending on the number of channels M and the standard number of channels N, in the case that the number of channels M is larger than the standard number of channels N.

In another aspect of the first electronic program table processing apparatus of the present invention, the display mode changing device changes the display mode to enlarge a display frame per one channel in the electronic program table.

According to this aspect, since the display frame per one channel is enlarged in the case that the number of receivable channels M is smaller than the standard number of channels N displayable on one screen, it is possible to display only the receivable channels in the electronic program table, resulting in the improved display efficiency of the electronic program table.

In another aspect of the first electronic program table processing apparatus of the present invention, the display mode changing device changes the display mode to increase the number of characters displayable in the enlarged display frame, if the display frame is enlarged.

According to this aspect, the display frame is enlarged and the number of characters displayable in the frame is increased, in the case that the number of receivable channels M is smaller than the standard number of channels N displayable on one screen. Therefore, the display efficiency is improved, and the information amount provided to the user can be increased.

In another aspect of the first electronic program table processing apparatus of the present invention, the display mode changing device changes the display mode to enlarge a character size to be displayed in the enlarged display frame, if the display frame is enlarged.

According to this aspect, the display frame per one channel is enlarged, and the character size to be displayed in the frame is enlarged in the case that the number of receivable channels M is smaller than the standard number of channels N displayable on one screen. Therefore, the display efficiency is improved, and the visibility is improved.

To achieve the above-mentioned object of the present invention, a second electronic program table processing apparatus of the present invention is provided. The second electronic program table processing apparatus is an apparatus for generating an electronic program table on the basis of a broadcasting signal received by a receiving device and displaying the electronic program table on a display device. The broadcasting signal includes video information relating to a plurality of channels and program information to display the electronic program table relating to the plurality of channels. The second electronic program table processing apparatus comprises: a holding device for holding the standard number of channels N (N is natural number) displayable on one screen of the display device; a program information obtaining device for obtaining the program information from the received broadcasting signal; a number obtaining device for obtaining the number of channels M (M is natural number) presently receivable by the receiving device; and a display mode changing device for dividing the electronic program table into a plurality of pages switchable to each other on one screen of the display device, depending on the number of channels M obtained by the number obtaining device and the standard number of channels N held by the holding device, if the number of channels M is larger than the standard number of channels N.

According to the second electronic program table processing apparatus of the present invention, the electronic program table is divided into a plurality of pages switchable to each other to be displayed depending on the number of channels M and the standard number of channels N, in the case that the number of channels M is larger than the standard number of channels N. Therefore, it is possible to obtain the electronic program table with the display efficiency being always high.

In another aspect of the second electronic program table processing apparatus of the present invention, the number obtaining device obtains the number of channels M on the basis of the obtained program information.

According to this aspect, the processing load to obtain the number of channels M can be reduced, since the number of channels M can be obtained on the basis of the obtained program information.

In another aspect of the second electronic program table processing apparatus of the present invention, the display mode changing device changes a display mode to enlarge a display frame per one channel in the electronic program table divided into the plurality of pages.

According to this aspect, the display frame can be enlarged per one channel in the electronic program table divided to be displayed, in the case that the number of channels M is larger than the standard number of channels N. Therefore, the display efficiency of the electronic program table can be improved.

In another aspect of the second electronic program table processing apparatus of the present invention, the display mode changing device changes the display mode to increase the number of characters displayable in the enlarged display frame, if the display frame is enlarged.

According to this aspect, the display frame per one channel can be enlarged, and the number of characters displayable in the frame is increased, in the case that the number of channels M is larger than the standard number of channels N. Therefore, the display efficiency can be improved, and the information amount provided to the user can be increased.

In another aspect of the second electronic program table processing apparatus of the present invention, the display mode changing device changes the display mode to enlarge a character size to be displayed in the enlarged display frame, if the display frame is enlarged.

According to this, the display frame per one channel can be enlarged, and the character size to be displayed in the frame is enlarged. Therefore, the display efficiency can be improved, and the visibility can be improved.

To achieve the above-mentioned object of the present invention, a first electronic program table processing method of the present invention is provided. The first electronic program table processing method is a method of generating an electronic program table on the basis of a broadcasting signal received by a receiving device and displaying the electronic program table on a display device. The broadcasting signal includes video information relating to a plurality of channels and program information to display the electronic program table relating to the plurality of channels. The first electronic program table processing method comprises: a program information obtaining process of obtaining the program information from the received broadcasting signal; a present number obtaining process of obtaining the number of channels M (M is natural number) presently receivable by the receiving device; a standard number obtaining process of obtaining the standard number of channels N (N is natural number) displayable on one screen of the display device from a holding device for holding the standard number of channels N; and a display mode changing process of changing a display mode of the electronic program table displayed on one screen of the display device, depending on the number of channels M obtained in the present number obtaining process, if the number of channels M is smaller than the standard number of channels N obtained in the standard number obtaining process.

According to the first electronic program table processing method of the present invention, it is possible to obtain the electronic program table with the display efficiency being always high.

To achieve the above-mentioned object of the present invention, a second electronic program table processing method of the present invention is provided. The second electronic program table processing method is a method of generating an electronic program table on the basis of a broadcasting signal received by a receiving device and displaying the electronic program table on a display device. The broadcasting signal includes video information relating to a plurality of channels and program information to display the electronic program table relating to the plurality of channels. The second electronic program table processing method comprises: a program information obtaining process of obtaining the program information from the received broadcasting signal; a present number obtaining process of obtaining the number of channels M (M is natural number) presently receivable by the receiving device; a standard number obtaining process of obtaining the standard number of channels N (N is natural number) displayable on one screen of the display device from a holding device for holding the standard number of channels N; and a display mode changing process of dividing the electronic program table into a plurality of pages switchable to each other on one screen of the display device, depending on the number of channels M obtained in the present number obtaining process and the standard number of channels N obtained in the standard number obtaining process, if the number of channels M is larger than the standard number of channels N.

According to the second electronic program table processing method of the present invention, it is possible to obtain the electronic program table with the display efficiency being always high.

To achieve the above-mentioned object of the present invention, a first computer program product of the present invention is provided. The first computer program product is a computer program product in a computer-readable medium for tangibly embodying a program of instructions executable by a computer to make the computer function as the first electronic program table processing apparatus as mentioned above.

According to the computer program product, it is possible to obtain the electronic program table with the display efficiency being always high.

To achieve the above-mentioned object of the present invention, a second computer program product of the present invention is provided. The second computer program product is a computer program product in a computer-readable medium for tangibly embodying a program of instructions executable by a computer to make the computer function as the second electronic program table processing apparatus as mentioned above.

According to the computer program product, it is possible to obtain the electronic program table with the display efficiency being always high.

To achieve the above-mentioned object of the present invention, a first television broadcasting receiving apparatus of the present invention is provided. The first television broadcasting receiving apparatus is an apparatus comprises: a receiving device for receiving a broadcasting signal including video information relating to a plurality of channels and program information to display an electronic program table relating to the plurality of channels; a display device; and the first electronic program table processing apparatus as mentioned above.

The television broadcasting receiving apparatus herein is a concept indicating an apparatus in general allowing to view television broadcasting obtained by receiving the broadcasting signal.

According to the first television broadcasting receiving apparatus of the present invention, a special there is no need for space to install the electronic program table processing apparatus, since the television broadcasting receiving apparatus is provided with the electronic program table processing apparatus. Therefore, it is possible to obtain the electronic program table with the display efficiency being always high, and the installation efficiency can be improved.

To achieve the above-mentioned object of the present invention, a second television broadcasting receiving apparatus of the present invention is provided. The second television broadcasting receiving apparatus is an apparatus comprises: a receiving device for receiving a broadcasting signal including video information relating to a plurality of channels and program information to display an electronic program table relating to the plurality of channels; a display device; and the second electronic program table processing apparatus as mentioned above.

According to the second television broadcasting receiving apparatus of the present invention, a special there is no need for space to install the electronic program table processing apparatus, since the television broadcasting receiving apparatus is provided with the electronic program table processing apparatus. Therefore, it is possible to obtain the electronic program table with the display efficiency being always high, and the installation efficiency can be improved.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 3 is a schematic diagram illustrating an example of the electronic program table of the EPG in the first embodiment.

FIG. 4A is a schematic diagram illustrating an example of the electronic program table of the EPG in the first embodiment.

FIG. 4B is a schematic diagram illustrating a state that the electronic program table shown in FIG. 4A is scrolled.

FIG. 5A is a schematic diagram illustrating an example of the electronic program table of the EPG in the first embodiment.

FIG. 5B is a schematic diagram illustrating a variation of the electronic program table shown in FIG. 5A.

FIG. 5C is a schematic diagram illustrating a variation of the electronic program table shown in FIG. 5A.

FIG. 8A is a schematic diagram illustrating an example of the electronic program table of the EPG in the second embodiment.

FIG. 8B is a schematic diagram illustrating the second page of the electronic program table.

FIG. 9A is a schematic diagram illustrating an example of the electronic program table of the EPG in the second embodiment.

FIG. 9B is a schematic diagram illustrating the second page of the electronic program table.

FIG. 9C is a schematic diagram illustrating the third page of the electronic program table.

DETAILED DESCRIPTION OF THE PREFERRED EMBODIMENTS

The preferred embodiments of the present invention will be discussed, with reference to drawings.

First Embodiment

Figure 1:
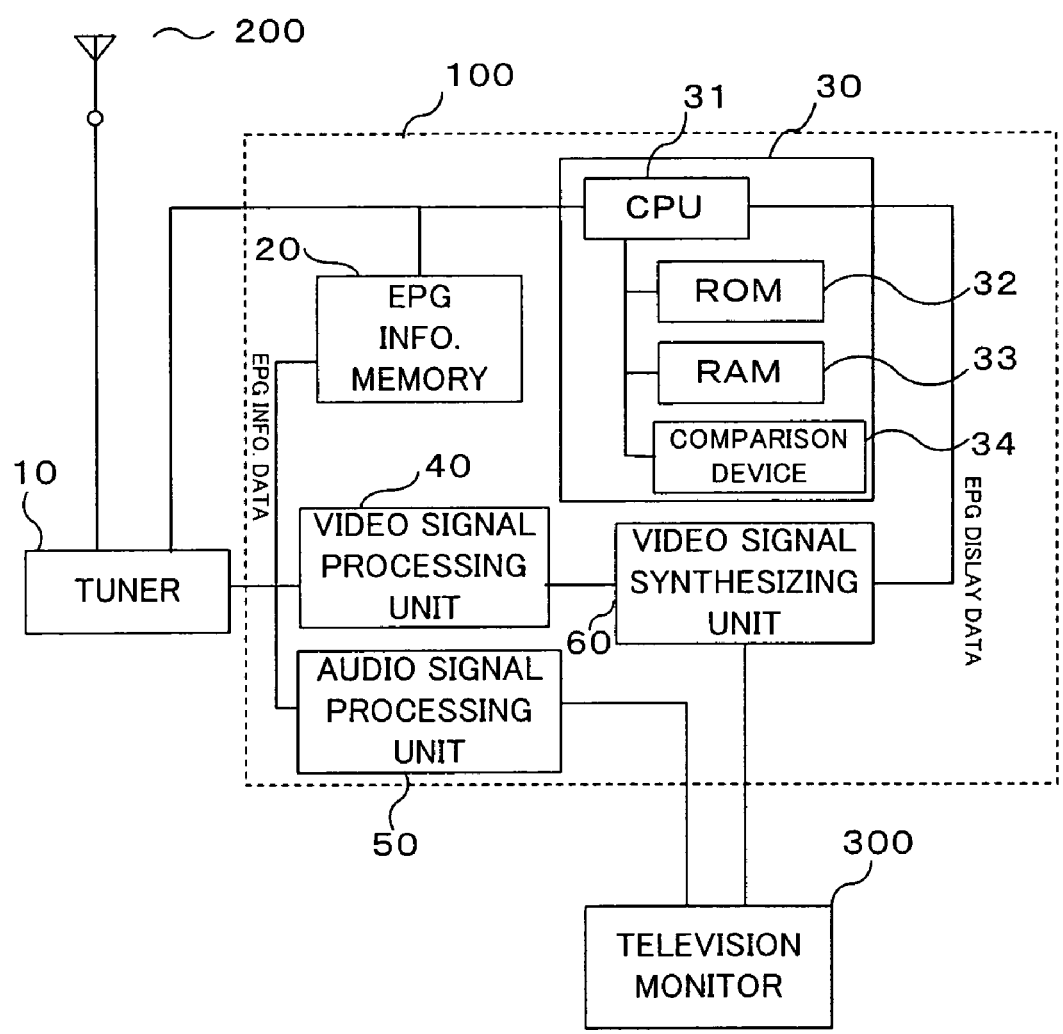
FIG. 1 is a block diagram of an electronic program table processing apparatus according to the first embodiment of the present invention.

Firstly, the first embodiment of the electronic program table processing apparatus according to the present invention will be explained, with reference to FIG. 1. FIG. 1 is a block diagram illustrating the first embodiment of the electronic program table processing apparatus.

In FIG. 1, the electronic program table processing apparatus 100 is provided with: an EPG information memory 20; an EPG processing unit 30; a video signal processing unit 40; an audio signal processing unit 50; and a vide signal synthesizing unit 60. A tuner 10 as an example of the "receiving device" according to the present invention is connected to an input side of the apparatus 100, and a television monitor 300 as an example of the "displaying device" according to the present invention is connected to an output side of the apparatus 100.

The tuner 10 receives a digital broadcasting signal via an antenna 200. The digital broadcasting signal is an example of the "broadcasting signal" according to the present invention. On the broadcasting signal, EPG information data, video signals and audio signals and so on are superimposed. The tuner 10 extracts and separates the EPG information data, a video signal within a specific frequency range selected by a user and an audio signal within the same frequency range and so on from the received digital broadcasting signal. Incidentally, the EPG information data is an example of the "program information" according to the present invention and constitute an EPG. The EPG includes the "electronic program table" according to the present invention. A frequency range of a video signal or an audio signal is an example of the "channel" according to the present invention. The digital broadcasting signal may be terrestrial digital broadcasting signal including video/audio signals relating to a plurality of channels and EPG information to display the EPG including the electronic program table relating to the plurality of channels.

The EPG information memory 20 is a buffer for temporarily storing the EPG information data separated by the tuner 10. This EPG information data includes information about the number of presently receivable channels and program information about each channel.

The EPG processing unit 30 generates EPG display data to display the EPG on a screen of the television monitor 300, on the basis of the EPG information data stored in the EPG information memory 20. The EPG processing unit 30 is provided with: a CPU (Control Processing Unit) 31; a ROM (Read Only Memory) 32, a RAM (Random Access Memory) 33, and a comparison device 34. Incidentally, the CPU 31 acts as the "program information obtaining device", the "number obtaining device" and the "display mode changing device" according to the present invention.

The video signal processing unit 40 generates video data to be displayed on a screen of the television monitor 300 from the video signal separated by the tuner 10. Furthermore, the audio signal processing unit 50 generates audio data to be output from a built-in speaker (not shown) of the television monitor 300, from the audio signal separated by the tuner 10.

The video signal synthesizing unit 60 synthesizes the vide data output from the video signal processing unit 40 with the EPG display data output from the EPG processing unit 30, finally to generate the video data to be displayed on the television monitor 300. In this arrangement, the user can select and view optionally either usual television programs or the EPG via a control panel of the television monitor 300, a remote controller or the like.

Incidentally, the tuner 10, the apparatus 100 and the television monitor 300 may be integrally constructed as a unit of television broadcasting receiver compatible with the digital broadcasting. Furthermore, they may have a bi-directional communication function interactive with a broadcasting station from which the digital broadcasting signal is transmitted.

Figure 2:
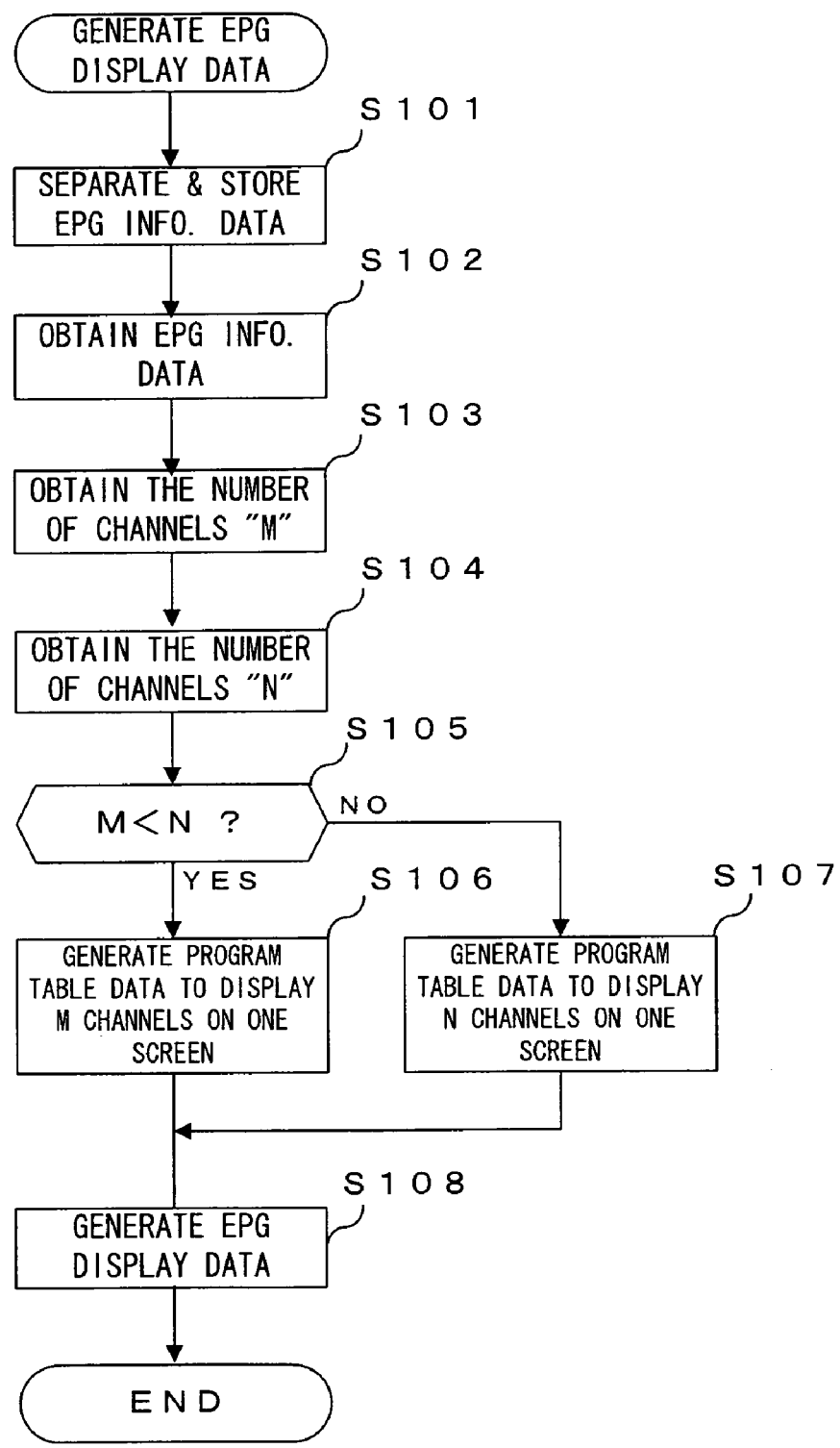
FIG. 2 is a flow chart showing an operational flow of generating the EPG display data at the EPG processing unit in the first embodiment.

Now, with reference to FIG. 2, an explanation is made on an operation of the apparatus 100. FIG. 2 illustrates an operational flow of processing the EPG display data at the EPG processing unit 30. The EPG information data transmitted with a broadcasting wave on which the data is superimposed is updated at a predetermined timing. In this embodiment, the processing to generate the EPG display data is performed at this timing at the EPG processing unit 30.

Firstly in FIG. 2, the CPU 31 controls the tuner 10 to separate the EPG information data from the digital broadcasting signal received via the antenna 200 and store the separated data into the EPG information memory 20 (step S101). Then, the CPU 31 obtains the EPG information data from the EPG information memory 20 (step S102). Then, the CPU 31 obtains the number of receivable channels M from the EPG information data (step S103).

In this embodiment, although the number of receivable channels M is included in the EPG information data in advance as described above, a way of obtaining the number of receivable channels is not limited to this. For example, the apparatus 100 may have a function for scanning channels, so that the user checks the number of receivable channels M by using this function when the apparatus 100 is installed. In this case, it is preferable that the number of receivable channels M obtained as such may be stored in a memory or the like, and this memory can be referred as appropriate in the apparatus 100. Furthermore, the apparatus 100 may have information in advance about the number of receivable channels correlated with local information. In this case, for example, it is preferable that the number of receivable channels M is stored automatically be designating the location or the postal code.

Then, the CPU 31 obtains the number of channels N displayable on one screen (step S104). The "the number of channels displayable on one screen" is a standard number of display channels of EPG, which is given to the apparatus 100 in advance as a product specification or the like. For example, this is the number of channels preset depending on the sales area or the sales country. The number is stored in the ROM 32 in advance. The apparatus 100 examines a quantitative relationship between the number of receivable channels M and the number of channels N. An appropriate number is preset as the number N, on the basis of a possible use area or the like of the apparatus 100.

After obtaining the number of receivable channels M and the number of channels N displayable on one screen, the CPU determines whether the number M is smaller or not than the number N, by means of the comparison device 34 (step S105).

If the number M is smaller than the number N (step S105: Yes), the CPU 31 generates program table data to display the program information for M channels on one screen and store it into the RAM 33 (step S106). On the other hand, if the number M equals to the number N, or larger than N (step S105: No), the CPU 31 generates program table data to display the program information for N channels on one screen and store it into the RAM 33 (step S107).

After step S106 or step S107 is performed, the CPU 31 generates EPG display data to display the EPG including the electronic program table on the television monitor 300 on the basis of the program table data generated at S106 or S107 (step S108), and outputs it to the video signal synthesizing unit 60. Then, the process of generating the EPG display data ends.

Now, with reference to FIG. 3 to FIG. 5C, an explanation is made on an electronic program table of the EPG actually displayed on the television monitor 300, in each case of step S105. FIG. 3 schematically illustrates an electronic program table of the EPG in the case that the number M equals to the number N (i.e. M=N), FIGS. 4A and 4B schematically illustrate an electronic program table of the EPG in the case that the number M is larger than the number N (i.e. M>N), and FIGS. 5A, 5B and 5C schematically illustrate an electronic program table of the EPG in the case that the number M is smaller than the number N (i.e. M<N). In FIG. 3 to FIG. 5C, the number of channels N displayable on one screen shall be "6". That is, the apparatus 100 is adapted to view six channels: channel A; channel B; channel C; channel D; channel E; and channel F.

FIG. 3 shows a typical electronic program table of the EPG (i.e. the electronic program table for the standard number of channels). Actually, the number of channels N displayable on one screen often equals to the number of receivable channels M, because an appropriate number is set for the number of channels N on the basis of the possible use area of the apparatus 100, as described above. The EPG in this case can provide the user with an appropriate amount of information, so that the EPG can satisfy at least minimum demands of the user with respect to the amount of the information. Additionally, the EPG in this case can provide a sufficient visibility. At step S107 mentioned above, the program table data is generated to generate such an EPG.

Incidentally, the EPG information data transmitted with the broadcasting signal on which the data is superimposed includes program information for each channel in each time zone. However, all contents of this program information are not always accommodated within each display frame of the EPG. In FIG. 3, the channel A has the information which is not accommodated in the display frame.

FIGS. 4A and 4B show the case that total eight channels (channels G and H are added to the predetermined six channels) can be received. In this case, since all the receivable channels cannot be displayed on one screen, the redundant two channels are displayed by scrolling the screen according to the user's instruction. This "user's instruction" is generated by a predetermined operation of a designation device such as a remote controller or a control panel. FIG. 4A illustrates a state that the predetermined six channels from channel A to channel F are displayed, and FIG. 4B illustrates a state that six channels from channel C to channel H after the scroll operation are displayed. Furthermore, arrows in FIGS. 4A and 4B show that scrolling is possible and the scrolling direction. Marks or symbols corresponding to these arrows may be actually displayed on the display screen. In this case, it is preferable that these marks or symbols are displayed so as not to disturb the visibility of the EPG.

Incidentally, a way of scrolling is not limited to a specific way. For example, it is possible to scroll sequentially one channel to one channel, or to scroll by a unit of plurality of channels. Furthermore, a way of displaying hidden channels into view is not limited to scrolling. For example, screens corresponding to FIGS. 4A and 4B may be switched to each other by a predetermined operation. At step S107 mentioned above, the program table data is generated to generate such an EPG.

FIGS. 5A, 5B and 5C illustrate a case that the number of receivable channels is "4". That is, channels B and E cannot be received. In this case, unless any measure or solution is not taken, blank channels (i.e. blank display frames) appear as mentioned with relation to the background of the invention. In contrast to this, in the embodiment of the present invention, the program information for four channels is displayed in a display area totally for the predetermined six channels. Specifically, the determination "Yes" is made at step S105 in FIG. 2, and the number of receivable channels M (4 channels in this case) are displayed with using a full space of the screen at step S106 in FIG. 2. In the case of the EPG constructed as such, a size of a display frame for one channel becomes 1.5 times the standard construction (the case of displaying 6 channels). As the display frame becomes large, the display efficiency is improved, and various additional quantities can be added to the EPG. FIGS. 5A to 5C show various forms of the EPG.

FIG. 5A shows a case that the number of characters displayed in the display frame is increased, as the display frame per one channel becomes large. As mentioned above, some program informations are not accommodated fully in the display frame of the EPG. Nevertheless, it is possible to increase the information accomodatable within the frame and thereby provide the increased amount of information to the user, by increasing the number of characters accomodatable in the frame. The channel "A" in FIG. 5A displays a hidden part of the channel "A" in FIG. 3, which cannot be accommodated in the frame. Thus, since the information amount is increased without sacrificing the visibility, the user's convenience is increased.

Alternatively, as shown in FIG. 5B, a size of character may be enlarged, as the display frame becomes large. In this case, the user's convenience is increased, since the visibility is improved by the enlarged character size, in spite of the information amount provided to the user is the same as in the case of FIG. 3.

Alternatively, as shown in FIG. 5C, a combination of these two measures is also possible in which the character size is enlarged and information amount is increased. In this case, it is more preferable that the EPG control unit 30 appropriately determines the balance between the character size and the information amount. The program table data to generate any of or all of these EPGs is generated at step S106 mentioned above.

Incidentally, a way of displaying in each frame in association with the change of the size of the frame for each channel is not limited to the examples mentioned above. For example, the user may register in advance the favorite channels, so that the EPG processing unit 30 generates the program table data for enlarging the display frames of the favorite channels in comparison with other channels. Alternatively, the user may determine the priority for channels, so that the EPG processing unit 30 determines the different size of the display frame channel by channel on the basis of the priority. That is, insofar as a display mode of the EPG is changed so as to improve the display efficiency including the number of receivable channels, in the case that the number of receivable channels is smaller than the number of displayable channels on one screen, a way of displaying is freely determined without limited to the even division of the display frame for all the receivable channels.

Incidentally, in the embodiment, updating the EPG is performed on the basis of the timing of updating the EPG information data. Nevertheless, the user may update the EPG at his/her desired timing. That is, the effect of the present invention is obtained regardless of the timing that the EPG control unit 30 performs the generating process of the EPG display data.

As explained above, according to the embodiment of the apparatus 100, a way of displaying the electronic program table of the EPG can be changed depending on a receiving state of the broadcasting wave. Therefore, it is possible to provide the electronic program table of the EPG extremely improved in the display efficiency to the user, and solve the problem as seen in the conventional apparatus as for the poor display efficiency of displaying the blank frame in the electronic program table of the EPG.

Second Embodiment

In the first embodiment mentioned above, in some cases that the number of receivable channels is larger than the number of displayable channels on one screen, switching the whole of the screen at a stroke may provide higher display efficiency than the aforementioned scroll display. So, the second embodiment of the present invention will be discussed, in view of such cases.

Although a hardware structure of the second embodiment is the same as that of the first embodiment shown in FIG. 1, the processing performed by the EPG control unit 30 is different therebetween.

Figure 6:
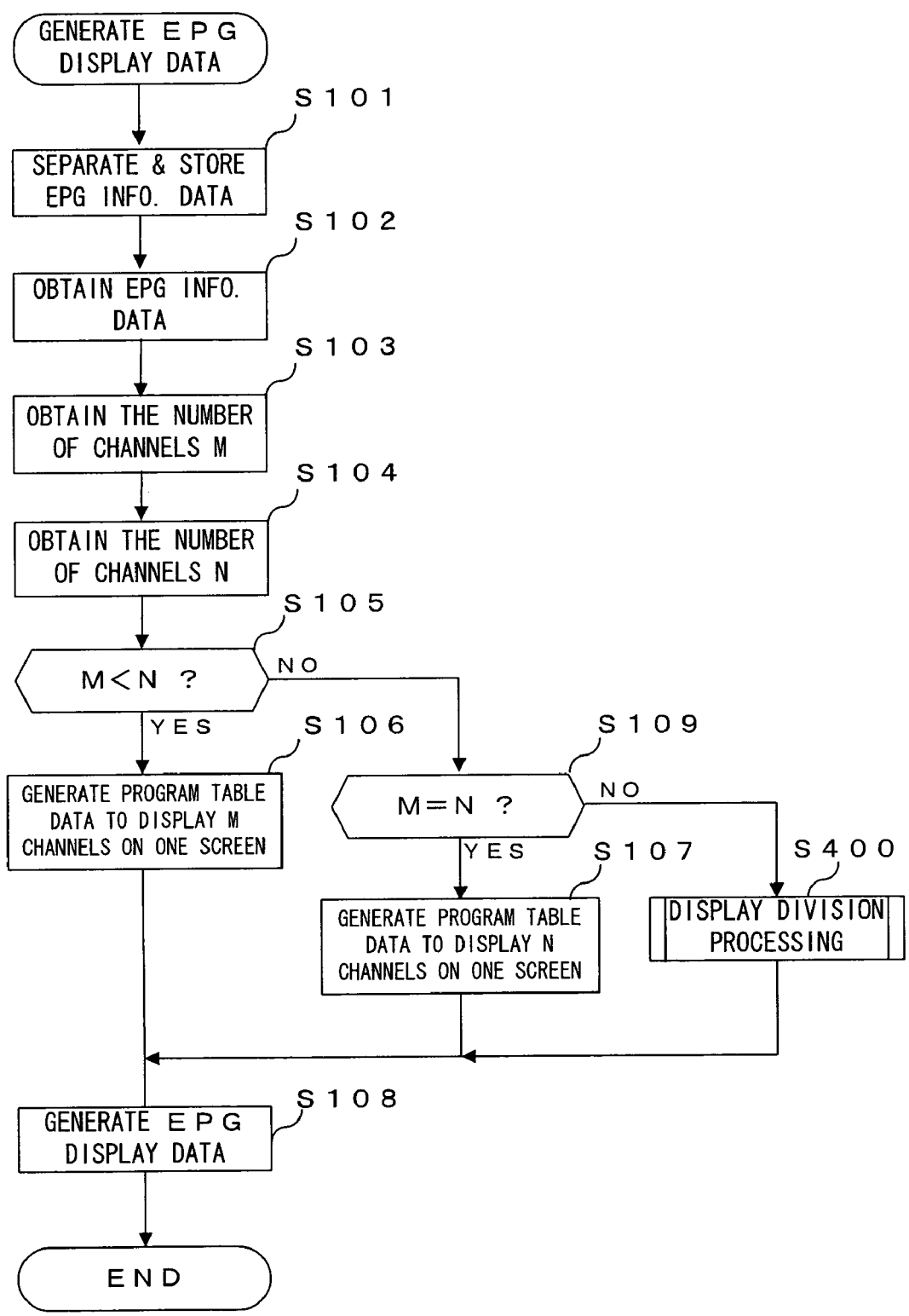
FIG. 6 is a flow chart showing an operational flow of generating the EPG display data at the EPG processing unit in the second embodiment of the present invention.

With reference to FIG. 6, an explanation is made on the operation of this embodiment. FIG. 6 illustrates an operational flow of generating the EPG display data at the EPG processing unit 30 of the apparatus 100 according to the second embodiment. Incidentally, in FIG. 6, the same steps as those in FIG. 2 carry the same reference numbers and the explanation of them is omitted.

In FIG. 6, if step S105 is "No", that is, the number of receivable channels M is not smaller than the number of channels N displayable on one screen, the CPU 31 examines whether or not the number M equals to the number N (step S109). If the number M equals to the number N (step S105: Yes), the CPU 31 generates the program table data to display the program information for N channels on one screen, and stores it into the RAM 33 (step S107). On the other hand, if the number M is larger than the number N (step S109: No), the CPU 31 performs a display divisional processing as discussed below (step S400). That is, in the present embodiment, the display divisional processing is added to the first embodiment.

Figure 7:
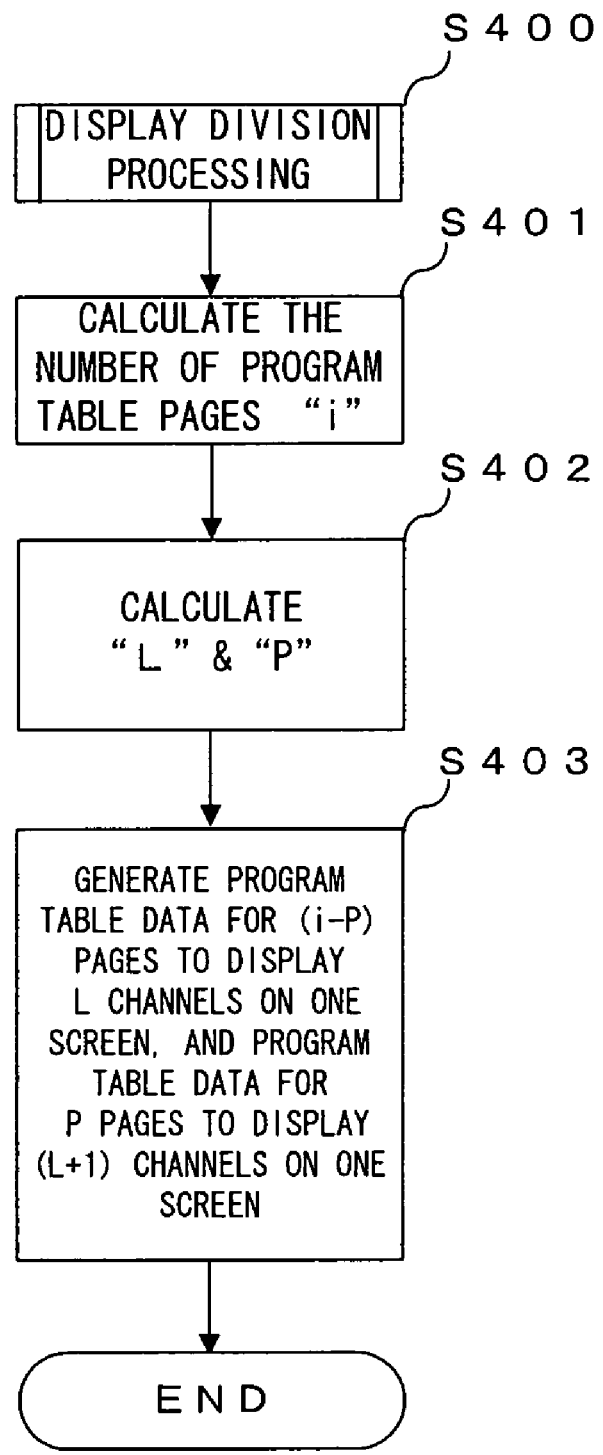
FIG. 7 is a flow chart showing the display division processing in processings shown in FIG. 6.

Now, an explanation is made on the display divisional processing according to this embodiment, with reference to FIG. 7. FIG. 7 illustrates an operational flow of the display divisional processing at the EPG processing unit 30. Incidentally, the unit of the information or data to be displayed on the whole of one screen is referred to as a "page".

In FIG. 7, the CPU 31 calculates the total number of pages "i" satisfying the following inequality (1), with respect to the number M and the number N (step S401).

$$(i-1)\cdot N \leq M \leq i\cdot N \quad (1)$$

Once the number of total pages "i" is calculated, the CPU 31 calculates the values "L" and "P" satisfying the following equation (2) (step S402).

$$M/i = L, \text{ remainder } P \quad (2)$$

Once the values "L" and "P" are calculated, the CPU 31 generates the program table data to display the program information for L channels per one screen corresponding to (i−P) pages, and other program table data to display the program information for (L+1) channels corresponding to P pages, and then stores them into the RAM 33 (step S403). Thus, the display division processing ends.

Again in FIG. 6, once the display division processing ends, the processing of generating the EPG display data goes to step S108, at which the EPG display data is generated to display the EPG on the television monitor 300, on the basis of the program table data generated at any of step S106, step S107 and step S403.

Now, the actual electronic program table of the EPG obtained as such will be discussed, with reference to FIGS. 8A to 9C. FIGS. 8A and 8B schematically show a case that the number of receivable channels is "7", and FIGS. 9A, 9B and 9C schematically show a case that the number of receivable channels is "17". Incidentally, in any case, the number of displayable channels N on one screen shall be "6", similarly to the first embodiment. Furthermore, the receivable channel names as for the typical six channels are the same as the first embodiment, and the channel names other than these six channels are referred to as "channel AA" to "channel FF", and "channel AAA" to "channel EEE".

In FIGS. 8A and 8B, the number of program pages delivered through the inequality (1) is "2", and the values "L" and "P" delivered through the equation (2) are "3" and "1", respectively. Therefore, the CPU 31 generates the program table data to display the program information for three channels on one screen corresponding to one page, and the program table data to display the program information for four channels on one screen corresponding to one page.

Similarly, in FIGS. 9A, 9B and 9C, the number of program table pages "i" delivered through the inequality (1) is "3", and the values "L" and "P" delivered through the equation (2) are "5" and "2", respectively. Therefore, the CPU 31 generates the program table data to display the program information for five channels on one screen corresponding to one page, and a program table data to display the program information for six channels on one screen corresponding to two pages.

In any case of FIGS. 8A to 9C, a way of displaying the EPG is changed so that the display frame in each channel is enlarged as for at least one page of the EPG. In the enlarged display frames, the number of characters (i.e. information amount) or the character size can be increased, as discussed in the first embodiment. This makes user's convenience improved.

Even if the display frame size is changed as mentioned above, the total number of pages to display all the receivable channels in the EPG is the same as in the case that the total number of pages to display the program information for N channels in the EPG. Therefore, the display efficiency is improved, while a time period to view the EPG for all the channels is maintained. That is, the aforementioned inequality (1) and the equation (2) are determined to improve the display efficiency within the minimum number of EPG screens.

Incidentally, for example, in the case of FIGS. 8A and 8B, two pages of EPG may be generated to display intentionally four channels on one screen. In this way, the processing load of the CPU 31 can be reduced. That is, this embodiment is achieved on the basis of the concept that the display screen of the EPG is divided into a plurality of pages, in the case that the number of receivable channels is larger than the number of displayable channels on one screen, so that the display efficiency of the EPG is improved. Insofar as this concept is ensured, a way of dividing the screen is not limited to the aspect of the embodiment.

Incidentally, the apparatus for processing the electronic program table according to the present invention, as shown as the apparatus 100, may be provided with the tuner 10 and the television monitor 300 and constructed integrally with the television broadcasting receiver. In this case, there is no need to pay attention to an install position of the apparatus, resulting in the improved installment efficiency.

Incidentally, in the aforementioned embodiment, the processings exemplified by flow charts of FIG. 2, as well as FIG. 6 and FIG. 7 are recorded as the electronic program table processing programs according to the present invention into a predetermined record medium such as a CD-ROM or a DVD, so that the programs are embodied by a computer for processing these programs. Furthermore, in this case, the program may be downloaded by the user who desires the program via a communication line such as Internet.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2004-006846 filed on Jan. 14, 2004 including the specification, claims, drawings and summary is incorporated herein by reference in its entirety.

What is claimed is:

1. An electronic program table processing apparatus for generating an electronic program table on the basis of a broadcasting signal received by a receiving device and displaying the electronic program table on a display device, the broadcasting signal including video information relating to a plurality of channels and program information to display the electronic program table relating to the plurality of channels, the electronic program table processing apparatus comprising:

a holding device for holding the standard number of channels N (N is natural number) displayable on one screen of the display device;

a program information obtaining device for obtaining the program information from the received broadcasting signal;

a number obtaining device for obtaining the number of channels M (M is natural number) presently receivable by the receiving device; and a display mode changing device for changing a display mode of the electronic program table displayed on said one screen, depending on the number of channels M obtained by the number obtaining device, if the number of channels M is smaller than the standard number of channels N held by the holding device.

2. The electronic program table processing apparatus according to claim 1, wherein
the number obtaining device obtains the number of channels M on the basis of the obtained program information.

3. The electronic program table processing apparatus according to claim 1, wherein
the display mode changing device maintains a standard display mode of the electronic program table, which is prepared in advance depending on the standard number of channels N, if the number of channels M is not smaller than the standard number of channels N.

4. The electronic program table processing apparatus according to claim 1, wherein
the display mode changing device divides the electronic program table into a plurality of pages switchable to each other on said one screen, depending on the number of channels M and the standard number of channels N, if the number of channels M is larger than the standard number of channels N.

5. The electronic program table processing apparatus according to claim 1, wherein
the display mode changing device changes the display mode to enlarge a display frame per one channel in the electronic program table.

6. The electronic program table processing apparatus according to claim 5, wherein
the display mode changing device changes the display mode to increase the number of characters displayable in the enlarged display frame, if the display frame is enlarged.

7. The electronic program table processing apparatus according to claim 5, wherein
the display mode changing device changes the display mode to enlarge a character size to be displayed in the enlarged display frame, if the display frame is enlarged.

8. An electronic program table processing method of generating an electronic program table on the basis of a broadcasting signal received by a receiving device and displaying the electronic program table on a display device, the broadcasting signal including video information relating to a plurality of channels and program information to display the electronic program table relating to the plurality of channels, the electronic program table processing method comprising:

a program information obtaining process of obtaining the program information from the received broadcasting signal;

a present number obtaining process of obtaining the number of channels M (M is natural number) presently receivable by the receiving device;

a standard number obtaining process of obtaining the standard number of channels N (N is natural number) displayable on one screen of the display device from a holding device for holding the standard number of channels N; and a display mode changing process of changing a display mode of the electronic program table displayed on said one screen, depending on the number of channels M obtained in the present number obtaining process, if the number of channels M is smaller than the standard number of channels N obtained in the standard number obtaining process.

9. A computer readable medium including thereon a computer program executable by a computer to make the computer function as an electronic program table processing apparatus for generating an electronic program table on the basis of a broadcasting signal received by a receiving device and displaying the electronic program table on a display device, the broadcasting signal including video information relating to a plurality of channels and program information to display the electronic program table relating to the plurality of channels, the electronic program table processing apparatus comprising:

a holding device for holding the standard number of channels N (N is natural number) displayable on one screen of the display device;

a program information obtaining device for obtaining the program information from the received broadcasting signal;

a number obtaining device for obtaining the number of channels M (M is natural number) presently receivable by the receiving device; and a display mode changing device for changing a display mode of the electronic program table displayed on said one screen, depending on the number of channels M obtained by the number obtaining device, if the number of channels M is smaller than the standard number of channels N held by the holding device.

10. An electronic program table processing apparatus for generating an electronic program table on the basis of a broadcasting signal received by a receiving device and displaying the electronic program table on a display device, the broadcasting signal including video information relating to a plurality of channels and program information to display the electronic program table relating to the plurality of channels, the electronic program table processing apparatus comprising:

a holding device for holding the standard number of channels N (N is natural number) displayable on one screen of the display device;

a program information obtaining device for obtaining the program information from the received broadcasting signal;

a number obtaining device for obtaining the number of channels M (M is natural number) presently receivable by the receiving device; and a display mode changing device for dividing the electronic program table into a plurality of pages switchable to each other on said one screen, depending on the number of channels M obtained by the number obtaining device and the standard number of channels N held by the holding device, if the number of channels M is larger than the standard number of channels N.

11. The electronic program table processing apparatus according to claim 10, wherein the number obtaining device obtains the number of channels M on the basis of the obtained program information.

12. The electronic program table processing apparatus according to claim 10, wherein the display mode changing device changes a display mode to enlarge a display frame per one channel in the electronic program table divided into the plurality of pages.

13. The electronic program table processing apparatus according to claim 12, wherein the display mode changing device changes the display mode to increase the number of characters displayable in the enlarged display frame, if the display frame is enlarged.

14. The electronic program table processing apparatus according to claim 12, wherein the display mode changing device changes the display mode to enlarge a character size to be displayed in the enlarged display frame, if the display frame is enlarged.

15. An electronic program table processing method of generating an electronic program table on the basis of a broadcasting signal received by a receiving device and displaying the electronic program table on a display device, the broadcasting signal including video information relating to a plurality of channels and program information to display the electronic program table relating to the plurality of channels, the electronic program table processing method comprising:

a program information obtaining process of obtaining the program information from the received broadcasting signal;

a present number obtaining process of obtaining the number of channels M (M is natural number) presently receivable by the receiving device;

a standard number obtaining process of obtaining the standard number of channels N (N is natural number) displayable on one screen of the display device from a holding device for holding the standard number of channels N; and a display mode changing process of dividing the electronic program table into a plurality of pages switchable to each other on said one screen, depending on the number of channels M obtained in the present number obtaining process and the standard number of channels N obtained in the standard number obtaining process, if the number of channels M is larger than the standard number of channels N.

16. A computer readable medium including thereon a computer program executable by a computer to make the computer function as an electronic program table processing apparatus for generating an electronic program table on the basis of a broadcasting signal received by a receiving device and displaying the electronic program table on a display device, the broadcasting signal including video information relating to a plurality of channels and program information to display the electronic program table relating to the plurality of channels, the electronic program table processing apparatus comprising:

a holding device for holding the standard number of channels N (N is natural number) displayable on one screen of the display device;

a program information obtaining device for obtaining the program information from the received broadcasting signal;

a number obtaining device for obtaining the number of channels M (M is natural number) presently receivable by the receiving device; and a display mode changing device for dividing the electronic program table into a plurality of pages switchable to each other on said one screen, depending on the number of channels M obtained by the number obtaining device and the standard number of channels N held by the holding device, if the number of channels M is larger than the standard number of channels N.

17. A television broadcasting receiving apparatus comprising:

a receiving device for receiving a broadcasting signal, the broadcasting signal including video information relating to a plurality of channels and program information to display an electronic program table relating to the plurality of channels;

a display device; and an electronic program table processing apparatus for generating the electronic program table on the basis of the broadcasting signal received by the receiving device and displaying the electronic program table on the display device, wherein the electronic program table processing apparatus comprises:

a holding device for holding the standard number of channels N (N is natural number) displayable on one screen of the display device;

a program information obtaining device for obtaining the program information from the received broadcasting signal;

a number obtaining device for obtaining the number of channels M (M is natural number) presently receivable by the receiving device; and a display mode changing device for changing a display mode of the electronic program table displayed on said one screen, depending on the number of channels M obtained by the number obtaining device, if the number of channels M is smaller than the standard number of channels N held by the holding device.

18. A television broadcasting receiving apparatus comprising:

a receiving device for receiving a broadcasting signal, the broadcasting signal including video information relating to a plurality of channels and program information to display an electronic program table relating to the plurality of channels;

a display device; and an electronic program table processing apparatus for generating the electronic program table on the basis of the broadcasting signal received by the receiving device and displaying the electronic program table on the display device, wherein the electronic program table processing apparatus comprises:

a holding device for holding the standard number of channels N (N is natural number) displayable on one screen of the display device;

a program information obtaining device for obtaining the program information from the received broadcasting signal;

a number obtaining device for obtaining the number of channels M (M is natural number) presently receivable by the receiving device; and a display mode changing device for dividing the electronic program table into a plurality of pages switchable to each other on said one screen, depending on the number of channels M obtained by the number obtaining device and the standard number of channels N held by the holding device, if the number of channels M is larger than the standard number of channels N.

* * * * *